US007654713B2

(12) United States Patent
Tendo et al.

(10) Patent No.: US 7,654,713 B2
(45) Date of Patent: Feb. 2, 2010

(54) VEHICULAR LAMP

(75) Inventors: Hiroki Tendo, Kanagawa (JP); Takehiko Tajima, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 80 days.

(21) Appl. No.: 12/013,802

(22) Filed: Jan. 14, 2008

(65) Prior Publication Data

US 2008/0170409 A1 Jul. 17, 2008

(30) Foreign Application Priority Data

Jan. 15, 2007 (JP) ............................ 2007-006160

(51) Int. Cl.
*B60Q 1/00* (2006.01)
*B60Q 3/00* (2006.01)

(52) U.S. Cl. ....................... 362/538; 362/309; 362/332; 362/336; 362/507; 362/522

(58) Field of Classification Search ......... 362/255-256, 362/307-309, 326, 332, 335-340, 507, 520-522, 362/538

See application file for complete search history.

(56) References Cited

U.S. PATENT DOCUMENTS 1,348,618 A * 8/1920 Zorger ........................ 362/309
5,036,438 A * 7/1991 Nakata ....................... 362/539

FOREIGN PATENT DOCUMENTS

JP 2543306 Y2 4/1997
JP 2001-6408 A 1/2001

OTHER PUBLICATIONS

English abstract of JP2001006408 published Jan. 12, 2001, esp@cenet database, 1 page.

* cited by examiner

*Primary Examiner*—Jason Moon Han
(74) *Attorney, Agent, or Firm*—Osha • Liang LLP

(57) ABSTRACT

A vehicular lamp includes a projection lens with an optical axis extending in a longitudinal direction of a vehicle and a light source with a light emission portion. The light emission portion is directly incident to the projection lens. The projection lens has a plurality of lens areas with different focal points, with the lens areas centered on the optical axis and disposed on generally concentric circles. The focal points corresponding to the plurality of lens areas have respectively different positions on the optical axis.

11 Claims, 4 Drawing Sheets

VEHICULAR LAMP

BACKGROUND OF INVENTION

1. Field of the Invention

The present invention relates to a vehicular lamp applicable to a low or high beam of a headlamp, a backup lens, a fog lamp, a clearance lamp, and the like, which is particularly useful as an auxiliary beam for a headlamp.

2. Background Art

Related art from this field includes Japanese Patent Application Laid-Open (Kokai) No. 2001-6408. A vehicular headlamp described therein is provided with a light bulb disposed between a reflecting mirror and a cylindrical lens, and between a lens and the reflecting mirror. Light emitted from the light bulb is formed from light incident to the reflecting mirrors and light directly incident to the lens so as to create a predetermined illumination from the reflective light and the direct light. In Utility Model Registration No. 2543306, a hemispheric convex lens is disclosed that creates a predetermined illumination from the light reflected by the reflecting mirror and the light passing through the lens.

[Patent Document 1] Japanese Patent Application Laid-Open (Kokai) No. 2001-6408

[Patent Document 1] Utility Model Registration No. 2543306

SUMMARY OF INVENTION

The lens employed in the conventional vehicular headlamp described above has one focal point, and a light bulb filament is disposed in the vicinity of the focal point. Therefore, problems arise in which the shape of the light bulb is prone to projection on a light distribution pattern, and furthermore, the outermost periphery of the light distribution pattern appears nearly red due to a chromatic aberration of the lens. A further problem results from using the reflecting mirror, which worsens light utilization efficiency.

One or more embodiments of the present invention provide a vehicular lamp that mitigates redness at an outer periphery of a light distribution pattern and creates a uniform light approaching white without using a reflecting mirror.

A vehicular lamp according to one or more embodiments of the present invention includes a projection lens with an optical axis extending in the longitudinal direction of a vehicle, and a light source with a light emission portion, the vehicular lamp characterized in that light from the light emission portion is directly incident to the projection lens, the projection lens has a plurality of lens areas with different focal points, with the lens areas centered on the optical axis and disposed on generally concentric circles, and the focal points corresponding to the plurality of lens areas have respectively different positions on the optical axis.

With such a vehicular lamp, an overall length can be shortened because a reflecting mirror is not used, and a simple structure with a small number of components makes downsizing possible. In addition, the projection lens is formed from a plurality of lens areas, which are aligned in generally concentric circles. Therefore, it is possible to combine the respective lens areas to create different focal points. The different focal points on the optical axis make it possible with respect to a light distribution pattern to mitigate redness at an outer periphery thereof and to create a uniform light.

Also, the respective positions of the focal points corresponding to the plurality of lens areas preferably follow the same order as the lens areas from the outer side to the inner side, and are placed in succession away from or approaching the projection lens. In such case, the different focal points follow the same order as the placement of the lens areas from the outer side to the inner side, and are placed away from or approaching the projection lens. Accordingly, adoption of the projection lens 2 the structure described above makes it possible with respect to a light distribution pattern to mitigate redness at an outer periphery thereof and create a more uniform light that approaches white.

In addition, the light emission portion is preferably arranged between the projection lens and a focal point among the plurality of focal points that is nearest the projection lens. Redness on the outer periphery side with respect to the light distribution pattern that is caused by a chromatic aberration of the lens can be efficiently eliminated. Thus, a lamp that emits a very conspicuous white light can be achieved.

The light emission portion is preferably shaped long in the vehicle width direction and short in the vehicle height direction. With such a structure, a horizontally long light distribution pattern can be easily created.

At least a portion of an outermost periphery on a front surface of the projection lens is preferably formed with a frosted light diffusing surface. Light is diffused by the frosted light diffusing surface, and therefore, redness at the outer periphery with respect to the light distribution pattern can be even more efficiently eliminated. A lamp that emits very conspicuous white light can thus be achieved.

According to one or more embodiments of the present invention, it is possible to mitigate redness at an outer periphery of a light distribution pattern, and to create a uniform light approaching white without using a reflecting mirror.

Other aspects and advantages of the invention will be apparent from the following description, the drawings and the claims.

DETAILED DESCRIPTION

Preferred embodiments of a vehicular lamp according to the present invention will be described in detail below with reference to the drawings.

Figure 1:
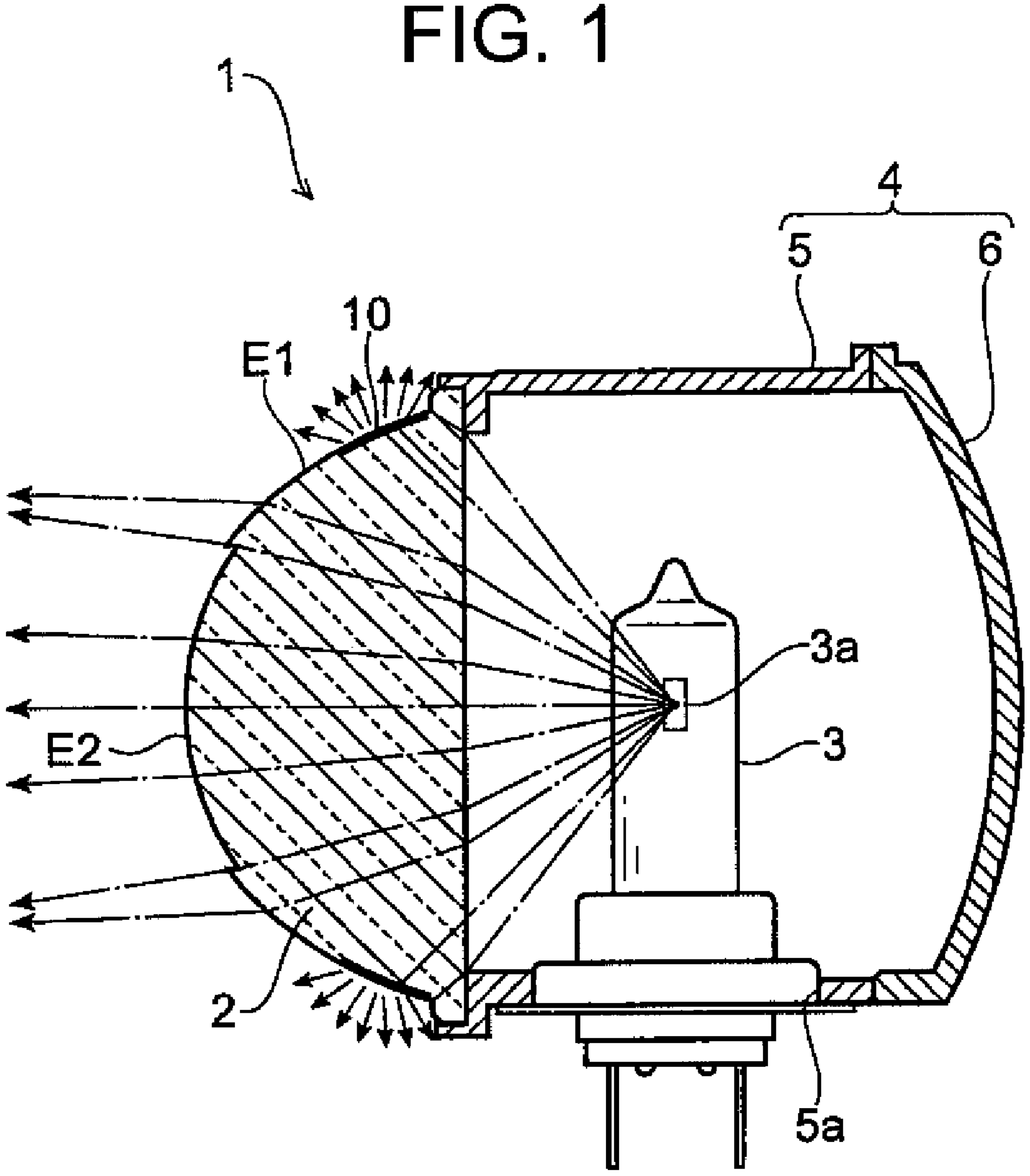
FIG. 1 is a cross-sectional view showing an embodiment of a vehicular headlamp according to the present invention.

Referring to FIG. 1, a vehicular lamp 1 is a direct optical type of headlamp capable of switching between low and high beams. The vehicular lamp 1 creates a light beam for overlapping on a high-beam pattern, without using a reflecting mirror. The vehicular lamp 1 is used with an aim to approach an upper limit value of a standard value for a high beam, for the purpose of extending a remote radiation distance of the high beam. Furthermore, the vehicular lamp 1 is provided with a glass projection lens 2 with a generally hemispheric shape, a halogen bulb 3 that emits white light and is used as a light source, and a housing 4 for protecting the halogen bulb 3. The housing 4 is formed from a body portion 5 and a cover 6. The body portion 5 has a cylindrical shape and an opening portion 5*a* that is formed as a side hole for inserting the halogen bulb 3 in the horizontal direction, and the cover 6 is used to close a rear end of the body portion 5.

Figure 2:
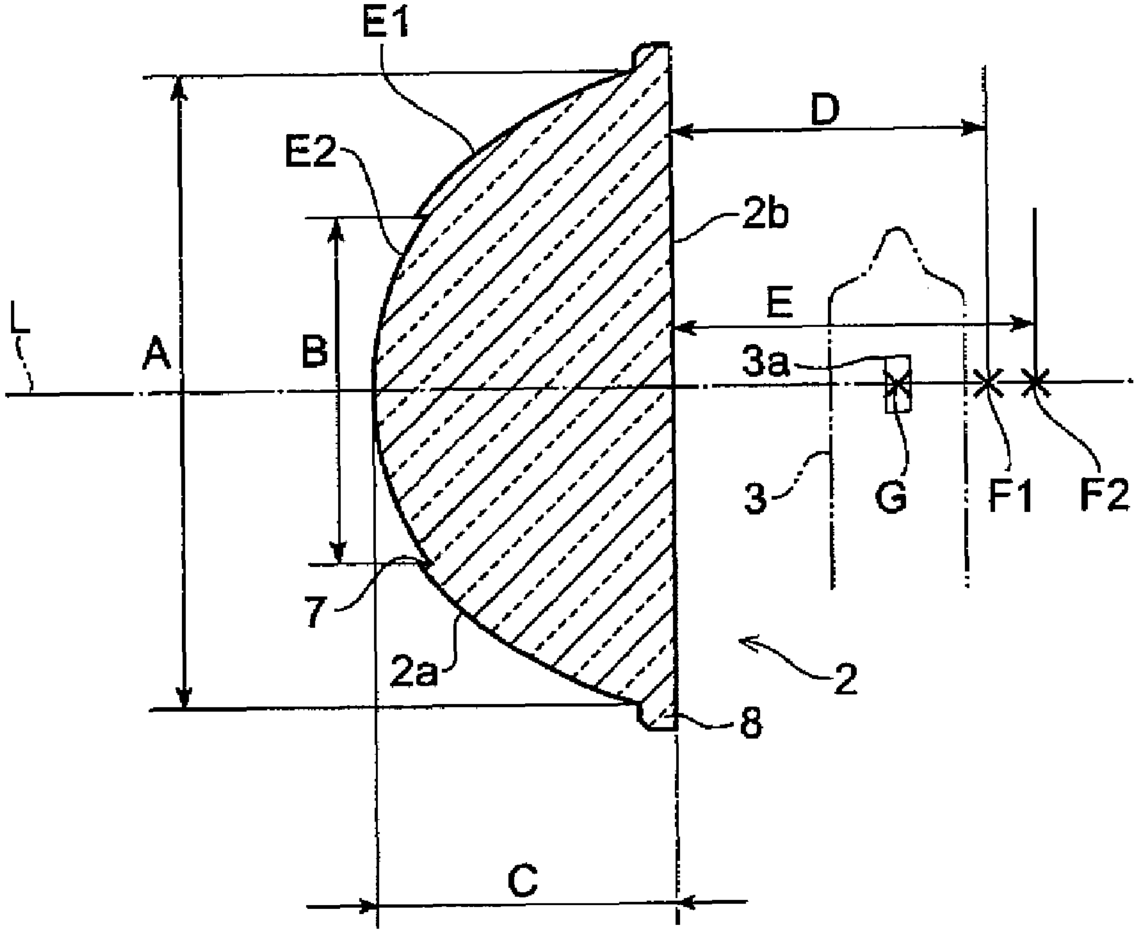
FIG. 2 is a view showing a main portion of the vehicular lamp shown in FIG. 1.

Referring to FIG. 2, the projection lens 2 is an aspheric lens formed from an aspheric front surface 2*a* and a flat back surface 2*b*, and includes an optical axis L that extends in a front-back direction of a vehicle. In addition, the front surface 2*a* of the projection lens 2 includes two lens areas E1, E2 with mutually different focal points, wherein the first lens area E1 on the outer side and the second lens area E2 on the inner side are disposed on generally concentric circles. Accordingly, the first lens area E1 forms a band-like ring, and the second lens area E2 forms a circular shape. Also, a boundary portion between the first lens area E1 and the second lens area E2 is provided with a stepped portion 7 that forms a ring-like line configuration.

As shown in FIG. 1, a diffusion degree of light in the lens area E2 gradually increases from the center to the outer side. In the lens area E1, the diffusion degree of light increases from the inner side toward the outer side, but not to the same degree as in the lens area E2.

Referring to FIG. 2, the first lens area E1 position on the outer side of the projection lens 2 has a short focal point distance, whereas the second lens area E3 positioned on the inner side of the projection lens 2 has a longer focal point distance. Thus, a focal point F1 of the first lens area E1 is positioned on the front side of a focal point F2 of the second lens area E2 on the optical axis L. Following the same order as the placement of the first and second lens areas E1, E2 from the outer side to the inner side, the respective focal points F1, F2 corresponding to the two lens areas E1, E2 are placed in succession away from the back surface 2*b* of the projection lens 2.

More specifically, in one or more embodiments, an outer shape A of the first lens area E1 has a diameter of 54 mm, and an outer shape B of the second lens area E2 has a diameter of 30 mm. A thickness C of the projection lens 2 is 25.7 mm. In addition, a focal point distance D for the focal point F1 is 21 mm, and a focal point distance for the focal point F2 is 25 mm. Also, the projection lens 2 is provided with a ring-like flange portion 8 whose approximate dimensions include a width of 2 mm and a thickness of 3 mm.

Furthermore, a light emission portion 3*a* of the halogen bulb 3 is set at a position separate from the focal points F1, F2 on the optical axis L, and is disposed between the projection lens 2 and the focal point F1, which among the two focal points F1, F2 is on the side nearest the projection lens 2. A light emission center G of the light emission portion 3*a* is separated 19 mm to 19.5 mm from the back surface 2*b* of the projection lens 2.

By configuring a vehicular lamp 1 as described above, the overall length of the lamp can be shortened because a reflecting mirror is not used. Also, the simple structure with its small number of components makes down-sizing possible. In addition, the projection lens 2 is formed from the first and second lens areas E1, E2, which are aligned in generally concentric circles. Therefore, it is possible to combine the respective lens areas E1, E2 to create two types of different focal points. Following the same order as the placement of the first and second lens areas E1, E2 from the outer side to the inner side, the different focal points are placed in succession away from the projection lens 2. Accordingly, adoption of the projection lens 2 having the structure described above makes it possible to mitigate redness at an outer periphery of the light distribution pattern and create a more uniform light that approaches white.

Moreover, by arranging the light emission center between the back surface 2*b* of the projection lens 2 and the forward-side focal point F1 corresponding to the outer-side first lens area E1, redness on the outer periphery side of the light distribution pattern, which is caused by a chromatic aberration of the lens, can be efficiently eliminated. Thus, a lamp 1 with high visibility that emits a very conspicuous white light can be achieved.

Figure 3:
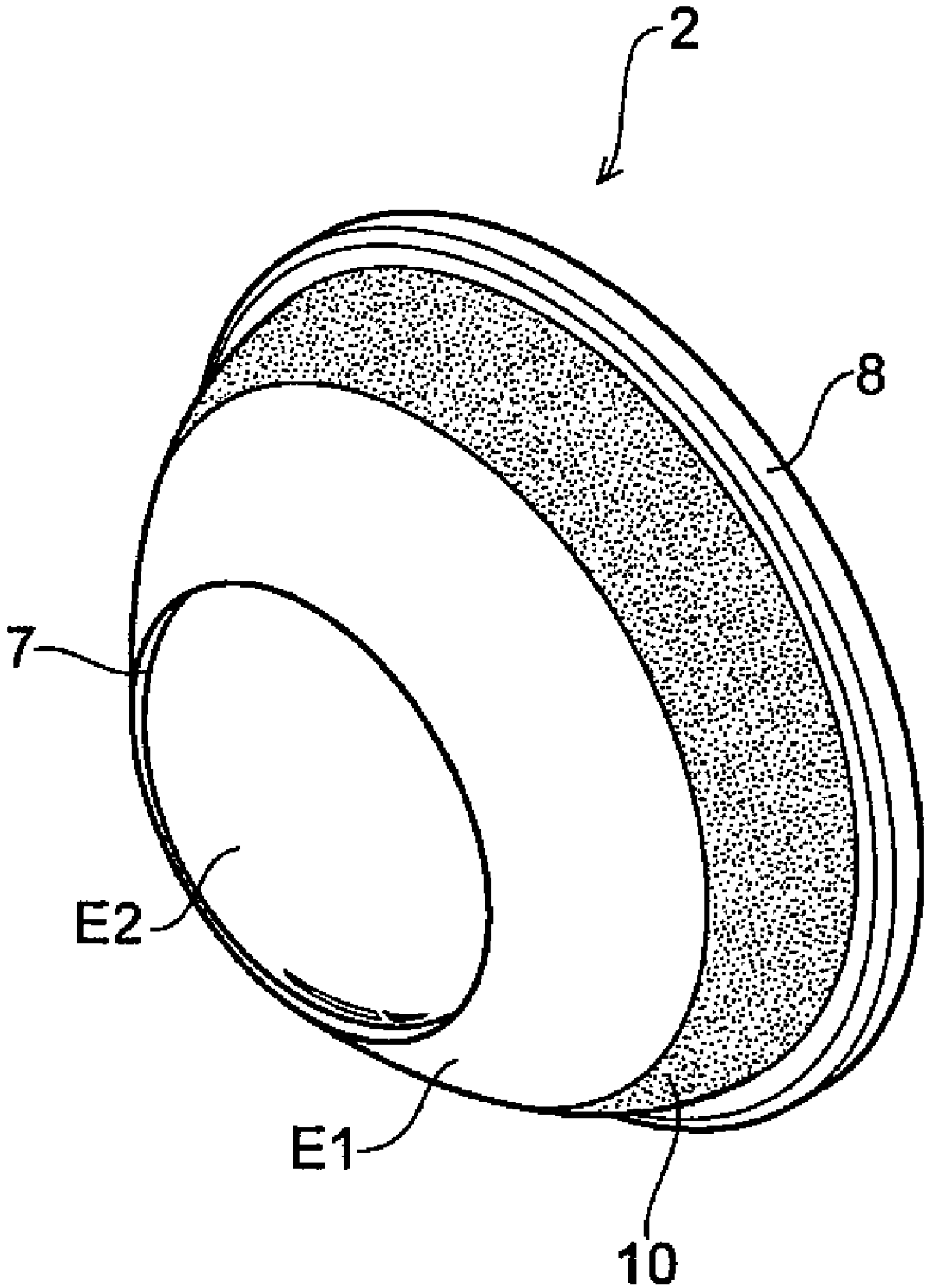
FIG. 3 is a perspective view showing a projection lens.

Referring to FIG. 3, the outermost periphery on the front surface 2*a* of the projection lens 2 is formed with a frosted and ring-like light diffusing surface 10. Light is diffused by the light diffusing surface 10 (see FIG. 1), and therefore, redness at the outer periphery of the light distribution pattern can be even more efficiently eliminated. A lamp 1 that emits very conspicuous white light can thus be achieved. The light diffusing surface 10 is formed band-like so as to cover generally half of the outer periphery of the first lens area E1, which generates redness due to the chromatic aberration of the lens. Forming the above-described light diffusing surface 10 on the front surface 2*a* of the projection lens 2 may be achieved in one or more embodiments by creating the light diffusing surface on the molding surface of an injection molding die. This enables easy lens formation. Also, in one or more embodiments, the light diffusing surface 10 may be formed in a band-like circular shape on the back surface 2*b* of the projection lens 2.

Figure 4A:
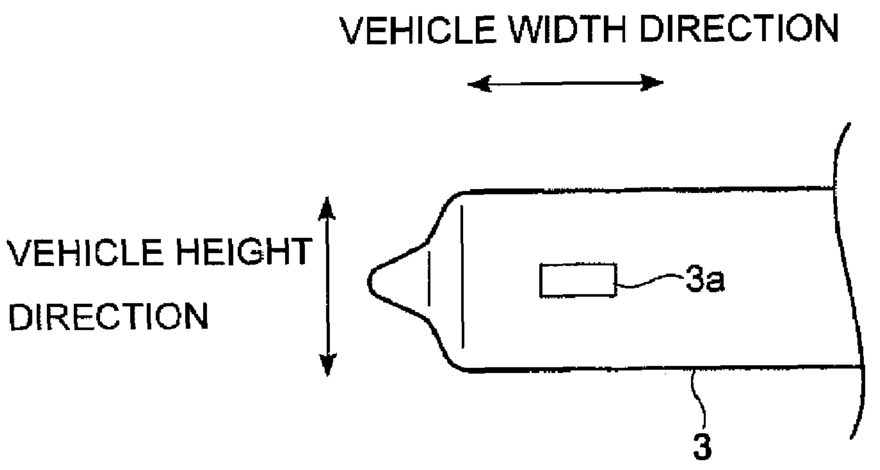
FIG. 4(*a*) is a view showing a halogen bulb, and FIG. 4(*b*) is a view.
Figure 4B:
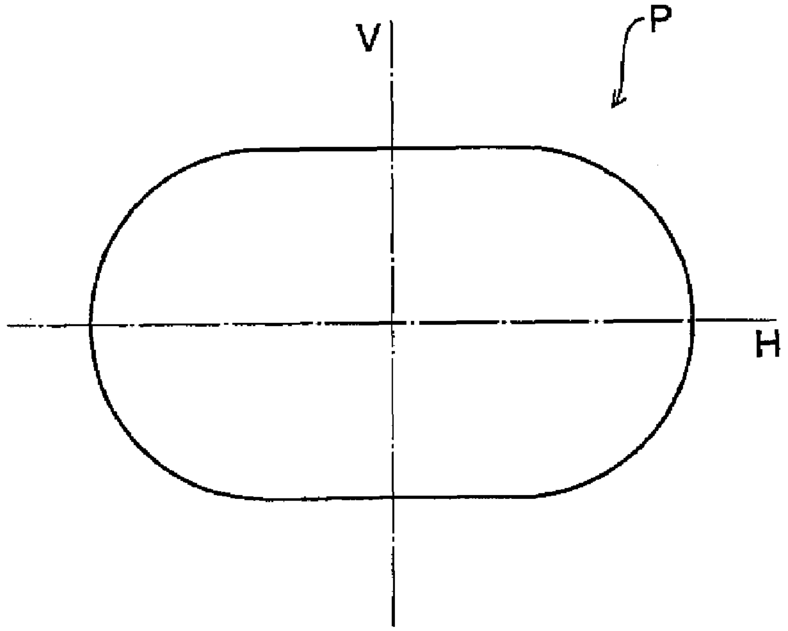

As shown in FIG. 4(*a*), the light emission portion 3*a* disposed within the vehicular lamp 1 is shaped long in the vehicle width direction and short in the vehicle height direction. In other words, the light emission portion 3*a* within the lamp 1 is arranged in a horizontally long state in the horizontal direction. Consequently, as shown in FIG. 4(*b*), a horizontally long light distribution pattern P can be created.

The present invention is not limited to the specific embodiments described above.

For example, the projection lens applied to one or more embodiments of the present invention may have three or more lens areas with different focal points. Also, the respective positions of the focal points corresponding to the plurality of lens areas may follow the same order as the lens areas from the outer side to the inner side, when placed approaching the projection lens in succession. One or more embodiments may involve arranging the light emission portion 3*a* between the back surface of the projection lens and the focal point farthest from the projection lens. Furthermore, a discharge bulb and an LED are also applicable as the light source. The vehicular lamp according to one or more embodiments of the present invention may be applied to a low or high beam of a headlamp, a backup lens, a fog lamp, a clearance lamp, and the like.

While description has been made in connection with embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF THE REFERENCE NUMERALS

1 VEHICULAR LAMP
2 PROJECTION LENS
2*a* FRONT SURFACE OF PROJECTION LENS
3 HALOGEN BULB (LIGHT SOURCE)
3*a* LIGHT EMISSION PORTION
10 LIGHT DIFFUSING SURFACE
E1, E2 LENS AREA
F1, F2 FOCAL POINT
G LIGHT EMISSION CENTER
L OPTICAL AXIS
P LIGHT DISTRIBUTION PATTERN

What is claimed is:

1. A vehicular lamp comprising:

a projection lens with an optical axis extending in a longitudinal direction of a vehicle, and a light source with a light emission portion, wherein light from the light emission portion is directly incident to the projection lens, wherein the projection lens has a plurality of lens areas with different focal points, with the lens areas centered on the optical axis and disposed on generally concentric circles, wherein the focal points corresponding to the plurality of lens areas have respectively different positions on the optical axis, and wherein the light emission portion is arranged between the projection lens and a focal point among the focal points that is nearest the projection lens.

2. The vehicular lamp according to claim 1, wherein the respective positions of the focal points corresponding to the plurality of lens areas follow the same order as placement of the lens areas from an outer side to an inner side, and are placed in succession away from or approaching the projection lens.

3. The vehicular lamp according to claim 2, wherein the light emission portion is shaped long in a vehicle width direction and short in a vehicle height direction.

4. The vehicular lamp according to claim 2, wherein at least a portion of an outermost periphery on a front surface of the projection lens is formed with a frosted light diffusing surface.

5. The vehicular lamp according to claim 1, wherein the light emission portion is shaped long in a vehicle width direction and short in a vehicle height direction.

6. The vehicular lamp according to claim 1, wherein at least a portion of an outermost periphery on a front surface of the projection lens is formed with a frosted light diffusing surface.

7. A method of manufacturing a vehicular lamp comprising:

configuring a projection lens with an optical axis extending in a longitudinal direction of a vehicle to have a plurality of lens areas with different focal points;

configuring the lens areas to be centered on the optical axis and disposed on generally concentric circles; and arranging the projection lens with respect to a light source such that the light source emits light directly incident to the projection lens, wherein the focal points corresponding to the plurality of lens areas have respectively different positions on the optical axis, and wherein the method further comprises arranging the light emission portion between the projection lens and a focal point among the focal points that is nearest the projection lens.

8. The method according to claim 7, further comprising placing the respective positions of the focal points corresponding to the plurality of lens areas in succession away from or approaching the projection lens, wherein the respective positions of the focal points corresponding to the plurality of lens areas follow the same order as placement of the lens areas from an outer side to an inner side.

9. The method according to claim 7, further comprising shaping the light emission portion long in a vehicle width direction and short in a vehicle height direction.

10. The method according to claim 7, further comprising forming at least a portion of an outermost periphery on a front surface of the projection lens with a frosted light diffusing surface.

11. A vehicular lamp comprising:

a projection lens with an optical axis extending in a longitudinal direction of a vehicle and at least a portion of an outermost periphery on a front surface of the projection lens formed with a frosted light diffusing surface; and a light source with a light emission portion shaped long in a vehicle width direction and short in a vehicle height direction, wherein light from the light emission portion is directly incident to the projection lens, wherein the projection lens has a plurality of lens areas with different focal points, with the lens areas centered on the optical axis and disposed on generally concentric circles, and wherein the focal points corresponding to the plurality of lens areas have respectively different positions on the optical axis that are placed in succession away from or approaching the projection lens following the same order as placement of the lens areas from an outer side to an inner side, wherein the light emission portion is arranged between the projection lens and a focal point among the focal points that is nearest the projection lens, and wherein the light source is one of a halogen bulb, a discharge bulb, and an LED.

* * * * *